United States Patent Office 3,655,677
Patented Apr. 11, 1972

---

3,655,677
N,N-DI-SUBSTITUTED AMIDES OF POLYFLUORO-ALKOXY-CARBOXYLIC ACIDS
Louis G. Anello, Orchard Park, and Richard F. Sweeney, Elma, N.Y., and Morton H. Litt, Cleveland, Ohio, assignors to Allied Chemical Corporation, New York, N.Y.
No Drawing. Continuation-in-part of application Ser. No. 633,359, Apr. 25, 1967. This application May 25, 1970, Ser. No. 40,433
Int. Cl. C07d 31/44
U.S. Cl. 260—295 AM
14 Claims

ABSTRACT OF THE DISCLOSURE

Compounds of the formula

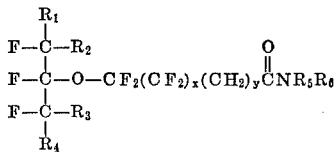

wherein (a) $R_1-R_4$ are each independently selected from the group consisting of F, Cl and perfluoroalkyl, and together can form a perfluorocycloalkylene group, with the proviso that $R_1-R_4$ may not contain more than two chlorine atoms, (b) $x$ is an integer of from 0–80, (c) $y$ is in integer of from 0–81, (d) $R_5$ and $R_6$ are independently selected from the group consisting of $-C_qH_{2q+1}$, $-C_tH_{2t}OH$, $-C_tH_{2t}Cl$ and, when taken together, may be

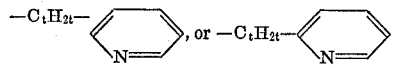

wherein $q$ is an integer from 1–24 and $t$ is an integer from 1–6; are useful as lubricants, surface active agents, and as intermediates in the sythesis of other surface active agents. The compounds described wherein $R_5$ and $R_6$ are $-C_qH_{2q+1}$ are additionally useful as insulator and condenser fluids, hydraulic fluids, and heat transfer media.

CROSS-REFERENCES TO RELATED APPLICATIONS (1) This application is a continuation-in-part of copending application of Anello et al., entitled "Telomers and Process for the Preparation Thereof," Ser. No. 633,359, filed Apr. 25, 1967, now U.S. Pat. No. 3,514,487, issued May 26, 1970.

(2) U.S. Pat. 3,453,333 to Litt et al., entitled "Fluorinated Ethers," issued July 1, 1969.

(3) Copending application of Litt et al., entitled "Fluorinated Ethers," Ser. No. 513,574, filed Dec. 13, 1965, now U.S. Pat. No. 3,470,256 issued Sept. 30, 1969.

(4) Copending application of Anello et al., entitled "Novel Fluorinated Alcohols," Ser. No. 721,089 filed Apr. 12, 1968, now abandoned.

(5) Copending application of Anello et al., entitled "Fluorocarbon Acids and Derivatives," Ser. No. 721,115, filed Apr. 12, 1968.

(6) Copending application of Anello et al., entitled "Fluorocarbon Compounds," Ser. No. 721,117, filed Apr. 12, 1968.

These applications and patents are hereby incorporated by reference.

SUMMARY OF THE INVENTION

This invention relates to novel N,N-di-substituted amides of polyfluoroalkoxy-carboxylic acids having the general formula:

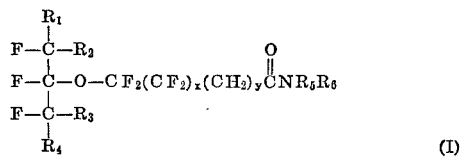 (I)

wherein (a) $R_1-R_4$ are each independently selected from the group consisting of F, Cl and perfluoroalkyl, and together can form a perfluorocycloalkylene groups, with the proviso that $R_1-R_4$ may not contain more than two chlorine atoms, (b) $x$ is an integer of from 0–80, (c) $y$ is an integer from 0–81, (d) $R_5$ and $R_6$ are independently selected from the group consisting of $-C_qH_{2q+1}$, $-C_tH_{2t}OH$, $-C_tH_{2t}Cl$ and, when taken together, may be

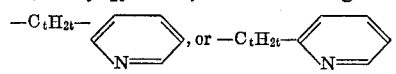

wherein $q$ is an integer from 1–24 and $t$ is an integer from 1–6.

The criticality in the structure of these compounds is in the polyfluoroisoalkoxyalkyl tail portion of the molecule wherein a carbon atom links an oxygen atom and a fluorine atom and wherein two fluoroalkyl linkages satisfy the remaining valences of the carbon atom linking the oxygen and fluorine atoms. The fluoroalkyl linkages are characterized by the presence of at least one fluorine atom on each carbon atom which is adjacent the carbon atom which links the oxygen and fluorine atoms. The fluoroalkyl linkages may, when taken together, form a perfluorocycloalkylene structure. The term polyfluoroisoalkoxyalkyl herein shall be understood as including such cycloaliphatic structures.

The novel substituted amides of the invention exhibit excellent surface activity and may be used as anti-wetting agents by conventional techniques. The anti-wetting properties may be taken advantage, for example, in improving heat transfer in heat exchanges by coating the heat exchange surfaces with the liquid novel substituted amides, or solvent solutions of the same.

Thus, a better heat transfer is effected between surfaces in which the condensate does not wet the heat exchanger surfaces, as compared with surfaces in which the condensate does wet the heat exchange surfaces. As is further well-known in the art, anti-wetting agents are useful as coatings on the interiors of containers. The non-wettable surfaces thus produced make it possible to dispense liquid materials from the containers without leaving a residue. Yet another example of the use of non-wetting agents is in the treatment of paper and textiles to impart water and oil repellency thereto. The substituted amides may be applied from any convenient solvent medium. Illustrative useful solvents from which the novel substituted amides may be applied to substrates to be treated include 1,1,2-trifluoroethane, trichloroethylene and toluene. The solutions of the substituted amides are applied to the substrates by conventional dipping, spraying or brushing techniques and the treated substrates are then dried to remove the solvent.

The novel hydroxyalkyl and chloroalkyl-substituted amides are also useful as intermediates in the synthesis of other valuable surface active agents which may be used as anti-wetting agents as above described. The chloroalkyl-substituted amides may be reacted with an aromatic amine, such as pyridine to form the pyridinium salts. The hydroxyalkyl-substituted amides may be oxidized to the acids with potassium permanganate or dichromate. The acids may then be converted to their salts by reaction with an aqueous base such as potassium hydroxide or sodium hydroxide. The pyridinium and acid salts have surface active properties and may be used in the manner in which surfactants are conventionally employed as discussed illustratively above.

The alkyl-substituted amides of the invention are thermally stable and are useful as heat transfer agents, hydraulic fluids, gyro-fluids, lubricants, and as insulator and condenser fluids. Specific useful applications include use as vapor phase coolants and dielectrics for electrical equipment and as temperature differential fluids in thermometric devices.

DETAILED DESCRIPTION OF THE INVENTION AND OF THE PREFERRED EMBODIMENTS

Referring to Formula I above, the $R_1$–$R_4$ groups are preferably all F. When $R_1$–$R_4$ are perfluoroalkyl groups, the preferred carbon content is from 1–6. When $R_1$–$R_4$ form a perfluorocycloalkylene group, the preferred carbon content of the cyclic ring is from 4–6.

The $R_5$ and $R_6$ groups are straight-chain or branched chain, but are preferably straight-chain.

$q$ is preferably an integer from 2–6 and $t$ is preferably an integer from 2–3. Still preferably, $q$ is an integer from 2–3 and, most preferably, $q$ and $t$ are both 2.

Preferably, $x$ is from 1–19 and, still preferably, from 1–14.

Preferably, $y$ is from 0–20 and, still preferably, from 0–15.

Most preferably, $x$ is an odd number from 1–13 and $y$ is 0 or an even number from 2–14.

The novel amides of Formula I, except where $R_5$ or $R_6$ are —$CH_2OH$ groups, may be prepared as described in parent application Ser. No. 633,359, mentioned supra, by reacting a corresponding telomer of the formula:

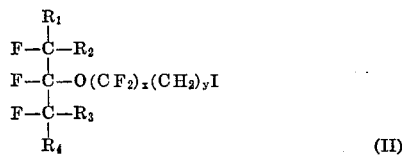

(II)

wherein $R_1$–$R_4$, $x$ and $y$ are as defined above and have the desired values, with a telomerizable unsaturated substituted amide of the formula:

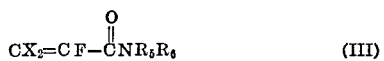

(III)

wherein X is H or F and $R_5$ and $R_6$ are as defined above, followed by reducing the resulting iodo containing compound with $LiAlH_4$ or with zinc and alcohol to substitute a hydrogen atom for the iodine atom. The iodo atom could also be replaced by fluorine by reaction with KF in a polar solvent.

Preparation of the telomer precursors of Formula II will be discussed in more detail hereinafter.

The unsaturated substituted amides of Formula III are a known class of compounds.

The compounds of the invention are preferably prepared by reacting corresponding acyl halides or esters of the formula:

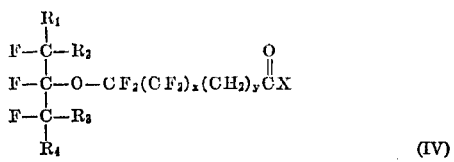

(IV)

wherein $R_1$–$R_4$, $x$ and $y$ are as defined in Formula I and wherein $x$ is halogen, preferably chlorine or fluorine, or $OR_7$ wherein $R_7$ is an alkyl group, with a secondary amine of the formula:

(V)

wherein $R_5$ and $R_6$ are as defined in Formula I.

These secondary amines are a known class of compounds.

The reaction temperature for this reaction is generally between about 0–150° C. Preferably the reaction temperature is from about 25° C. to about 120° C. The reaction is preferably carried out at atmospheric pressure although superatmospheric pressures may be employed if desired. Generally, reaction times of about 10 minutes to 24 hours are required to maximize yields. A sufficient amount of the secondary amine should be employed in order to insure high conversions of the starting esters or acyl halides to the desired substituted amides. A molar ratio of 1–3:1 amine:acyl halide or ester is preferred.

Compounds according to Formula I wherein $t$ in the —$C_tH_{2t}OH$ group is one, i.e. wherein $R_5$ or $R_6$ are —$CH_2OH$ groups, cannot be prepared by the above described technique. These compounds are prepared by reacting formaldehyde with corresponding unsubstituted amides of the formula:

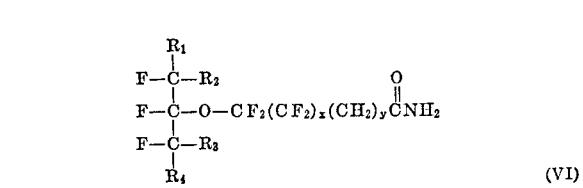

(VI)

A large excess of formaldehyde in the order of 5–10 moles should be employed for best results. The reaction can be carried out in the presence or absence of an inert solvent such as benzene, xylene, trifluorotrichloroethane, and the like. A basic catalyst such as sodium bicarbonate or sodium carbonate can also be employed if desired, but is not required.

The reaction is generally carried out at temperatures of about 70°–150° C. but this is not critical and higher or lower temperatures can be employed if desired. When the reaction is carried out in the absence of a solvent, the temperature is usually maintained above the melting point of the amide reactant.

The acyl halide and ester precursors may be prepared from the corresponding free acids by conventional procedures. The reaction of the free acid with thionyl chlordie, preferably in the presence of an inert organic solvent such as chloroform, procedures the corresponding acid chlorides. The reaction of the free acids with alkanols or with corresponding nitriles, preferably in the presence of an esterification catalyst produces the corresponding esters. The unsubstituted amide precursors may be prepared in conventional manner for the above-described esters by reaction with ammonia.

The free acid precursors having the formula:

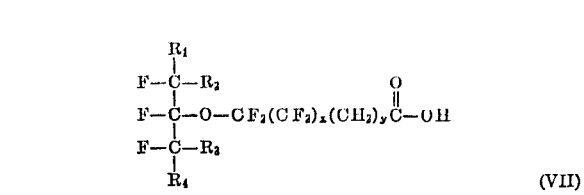

(VII)

may be prepared in a variety of ways, the preferred mode depending on the values of $x$ and $y$.

Carboxylic acids of Formula VII wherein $x$ and $y$ are each at least one, may be prepared by reacting a corresponding telomer iodide of the formula:

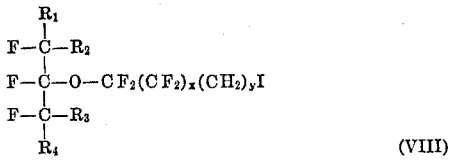

(VIII)

wherein $R_1$–$R_4$, $x$, $y$ are as described in Formula I, in which Formula VIII $x$ and $y$ are each at least one, with a water-soluble metal cyanide to form the corresponding nitrile. The nitrile can be hydrolyzed to the corresponding free acid in conventional manner.

Carboxylic acids having the Formula VII wherein $x$ is an odd integer and $y$ is an even integer may be prepared by reacting corresponding iodides of the Formula VIII by elimination of HI from the terminal group with a strong base to form the corresponding terminal olefins and oxidizing the olefins with a conventional oxidizing agent such as permanganate or dichromate to the carboxylic acids.

Carboxylic acids of Formula VII wherein $x$ is an even integer and $y$ is an odd or even integer, may be prepared by reacting the corresponding iodide of Formula VIII with a terminally unsaturated hydrocarbon carboxylic acid or its corresponding ester in the presence of a free radical initiator to form the corresponding iodocarboxylic acids or ester. The iodocarboxylic acid can be reduced to the free acid in conventional manner, as with zinc in alcohol. The ester can be hydrolyzed to the free acid in known manner. Alternatively, the iodo ester can be dehydrohalogenated in known manner, as with alkali to the corresponding alkenoic acid, and hydrogenated, as with hydrogen in the presence of a catalyst such as platinum oxide, to the corresponding carboxylic acid.

Carboxylic acids of Formula VII wherein $x$ is an odd integer and $y$ is 0 may be prepared by reacting a corresponding ester of Formula II with $(CN)_2$ under pressure of 20–200 atmospheres at temperatures of 300° C. or more, to form the corresponding nitrile. The nitrile can be hydrolyzed to the free acid in a conventional manner.

Carboxylic acids of Formula VII wherein $x$ and $y$ are 0 or wherein $x$ is an odd integer and $y$ is an odd integer, may be prepared by reacting a suitable iodide with $SO_3$ to form the pyrosulfate, or with oleum to form the hydrosulfate, and hydrolyzing the pyrosulfate or hydrosulfate to the corresponding alcohol. The alcohol can be oxidized to the free carboxylic acid with conventional oxidizing agents. The preparation of the alcohols is described in greater detail in copending U.S. application of Anello et al., Ser. No. 721,089 filed Apr. 12, 1968. The pertinent subject matter of this application is hereby incorporated by reference.

Carboxylic acids of Formula VII wherein $x$ is an odd integer and $y$ is one may be prepared from the corresponding alcohol by oxidation as hereinbefore described.

Carboxylic acids of the Formula VII wherein $x$ is an odd integer and $y$ is 1 may also be prepared by oxidation of the corresponding fluoroolefin containing a terminal ethylene group.

The fluoroolefin reactants can be prepared by reacting a suitable corresponding iodide with allyl alcohol at a temperature between 100–450° C., preferably from about 150–300° C., under subatmospheric pressure. The terminal ethylene group can be oxidized to the carboxylic acid in conventional manner.

The preparation of these acids and their precursors are described in greater detail in copending U.S. applications Ser. Nos. 721,115, 721,117 mentioned supra. Other modes of preparing these acids will readily occur to those persons skilled in the art.

The telomer iodides of Formula VIII and preparation thereof are described in copending parent U.S. application Ser. No. 633,359, mentioned supra. Essentially, these telomer starting materials may be prepared by telomerizing corresponding telogens of the formula:

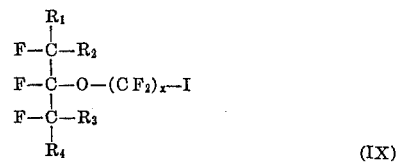

(IX)

wherein $R_1$–$R_4$ are as defined above and $x$ is 1 or 2. The telomerization may be effected with tetrafluoroethylene followed by telomerization with ethylene, or with ethylene alone.

The reaction between the telogen and the tetrafluoroethylene and/or ethylene compound is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the reaction may be conducted by use of a catalyst or light of sufficient intensity to initiate the free radical reaction. Illustrative free radical generating catalysts include azonitriles such as alpha,alpha'-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the product telomer.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound: telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e. telomers containing up to about 6 or 7 monomer units per telomer molecule. On the other hand, in a constant pressure reaction, i.e. where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telogens of Formula VII for the preparation of the telomers described above may be prepared by reaction of an appropriate halogenated ketone with an ionizable fluoride salt to form a fluorinated organic salt and then reacting the organic salt with a halogen other than fluorine (e.g. iodine, bromine) and an appropriate olefin to form the desired polyhaloisoalkoxyalkyl halide. The reactions are more fully described in U.S. Pat. 3,453,333 to Litt et al., entitled "Fluorinated Ethers," issued July 1, 1969 and copending application of Litt et al., Ser. No. 513,574, filed Dec. 13, 1965. For example, as is described in Examples 1 and 3 of U.S. Pat. 3,453,333, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $(CF_3)_2CFO^-K^+$ and thereafter reacting this addition compound with tetrafluoroethylene and iodine in the presence of an inert organic solvent to form the desired perfluoroisopropoxyethyl iodide, $(CF_3)_2CFOCF_2CF_2I$.

Illustrative compounds within the scope of the invention are shown as follows:

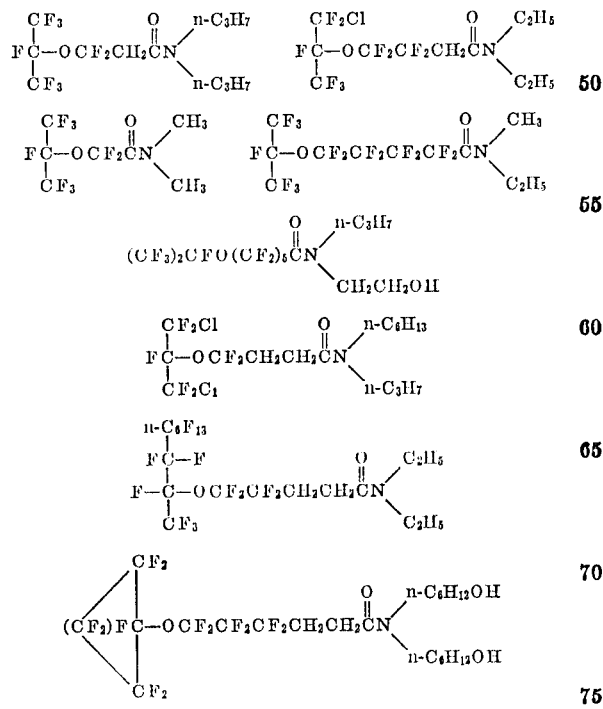

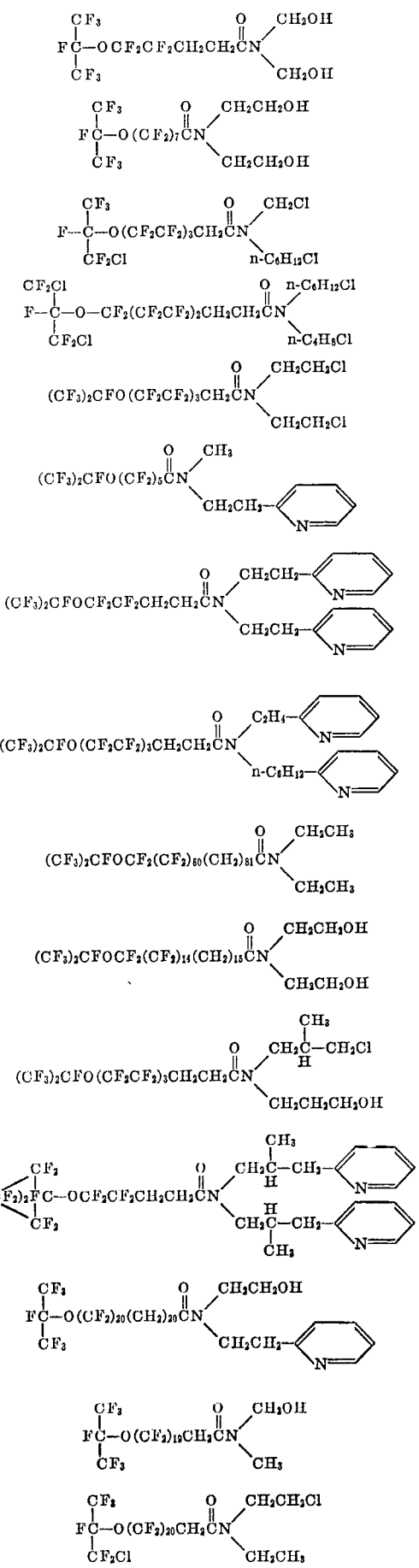

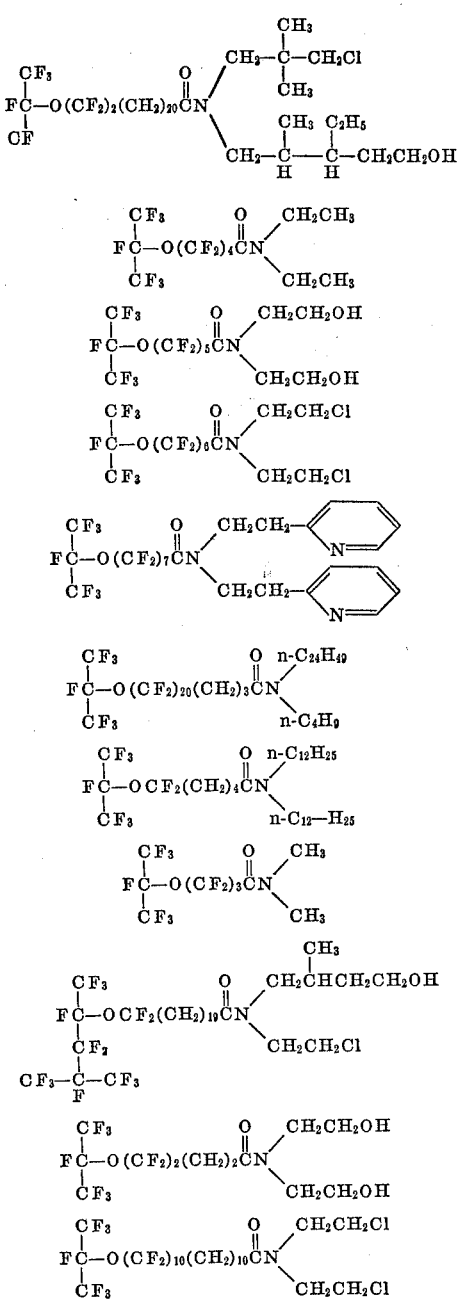

The following examples illustrate preparation of compounds of the invention. Parts and percentages are by weight unless otherwise indicated.

EXAMPLE 1

Preparation of

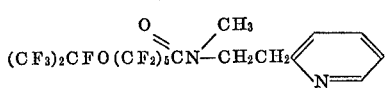

Into a 50 ml. 3-necked flask were placed 25 g. (0.048 mole) of $(CF_3)_2CFO(CF_2)_5COOCH_2CH_2CH_3$ and 6.5 g. (0.048 mole) of 2-(β-methylaminoethyl)pyridine,

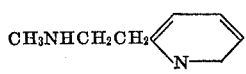

The mixture was warmed to 75° C. and maintained at that temperature for 1¼ hours during which time the reaction was completed. The product mixture was then distilled on a small spinning-band column. There were recovered 21.7 g. (0.036 mole) of

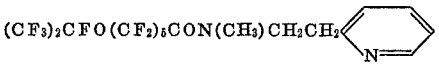

B.P. 110–111° C./0.2 mm., M.P. 28–30° C.

Analysis.—Calculated for $C_{17}F_{17}H_{11}ON_2$ (percent): C, 34.13; F, 53.80; H, 1.84; N, 4.66. Found (percent): C, 34.45; F, 53.32; H, 2.16; N, 6.13.

EXAMPLE 2

Preparation of $(CF_3)_2CFO(CF_2)_7CON(CH_2CH_2OH)_2$

Into a 500 ml. flask are placed 47 g. (0.45 mole) of diethanolamine in about 150 ml. of water. One hundred twenty grams (0.20 mole) of $(CF_3)_2CFO(CF_2)_7COCl$ are slowly added with stirring. Heat is evolved. The hot mixture is swirled intermittently and is allowed to stand overnight. Solid ammonium sulfate is added and the mixture is extracted several times with ether. The organic layer is treated wtih anhydrous calcium sulfate, filtered and evaporated in a stream of nitrogen. 114 grams (0.17 mole) of a crude product are obtained after drying. The crude product is purified by recrystallization from xylene-dimethylformamide to give the diethanol amide, $(CF_3)_2CFO(CF_2)_7CON(CH_2CH_2OH)_2$

EXAMPLE 3

Preparation of $(CF_3)_2CFO(CF_2)_3CON(CH_3)_2$

One hundred grams of $(CF_3)_2CFO(CF_2CF_2)_2OSO_2Cl$ are slowly added to an excess of dimethylamine at a temperature of 0° C. The reaction mixture is stirred at 0° and then at 25° C. for 0.5 hour. Upon extraction with diethylether and separation and drying of the ethereal extract, the ether is distilled off to leave the amide, $(CF_3)_2CFO(CF_2)_3CON(CH_3)_2$

EXAMPLE 4

Preparation of $CF_3(CF_2Cl)CFO(CF_2)_5 CON(n-C_3H_7)CH_2CH_2OH$

A flask is charged with 413 g. of isopropyl ether, 59 g. (1.0 mole) of n-propylamine. 149.5 g. (0.3 mole) of $CF_3(CF_2Cl)CFO(CF_2)_5COF$ are added over a period of 1½ hours, with constant stirring, to maintain the temperature at 25–30° C. The reaction mixture is then stirred for an additional 3 hours at 30° C. and then for 2 more hours at 40° C. After cooling to room temperature, the mixture is washed with 9% aqueous hydrochloric acid and the aqueous phase removed. The ether is removed by distillation yielding the amide, $CF_3(CF_2Cl)CFO(CF_2)_5CON(n-C_3H_7)H$ The sodium salt is prepared by dissolving 150 g. (0.25 mole) of the amide in 460 ml. of absolute methanol, and removing the alcohol under reduced pressure at a bath temperature of 70–80° C. The yield of dry salt is 156 gms. The salt is reacted with 25 g. of ethylene chlorohydrin for 5 hours at 110–115° C. The reaction mixture is cooled, washed with water and dried yielding the alkanol product $CF_3(CF_2Cl)CFO(CF_2)_5CON(n-C_3H_7)CH_2CH_2OH$ which is further purified by distillation.

EXAMPLE 5

Preparation of

A mixture of 23.95 g. (0.05 mole) of

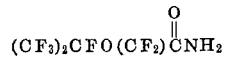

and 4.5 g. (0.15 mole) of p-formaldehyde is heated at about 80° C. for 24 hours to give 21 g. of a clear, yellow viscous liquid. The product is purified by trituration with petroleum ether and is found to contain

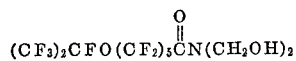

We claim:
1. Compound of the formula

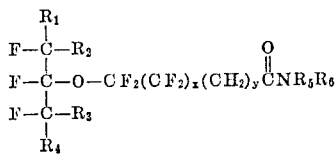

wherein
(a) $R_1$–$R_4$ are each independently selected from the group consisting of F, Cl and perfluoromethyl, and together can form a perfluorocycloalkylene group of from 4 to 6 carbon atoms, with the proviso that $R_1$–$R_4$ may not contain more than two chlorine atoms,
(b) $x$ is an integer of from 0 to 19,
(c) $y$ is an integer of from 0 to 20,
(d) $R_5$ and $R_6$ are independently selected from the group consisting of $$-C_qH_{2q+1}, -C_tH_{2t}OH, -C_tH_{2t}Cl$$

and

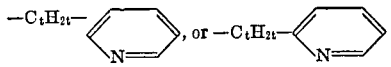

wherein $q$ is an integer from 1 to 6 and $t$ is an integer from 1–6 with a proviso that at least one of said terms $R_5$ or $R_6$ represents

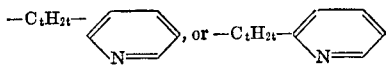

2. Compound according to claim 1 wherein $q$ is an integer from 2–6 and $t$ is an integer from 2–3.
3. Compound according to claim 2 wherein $q$ is an integer from 2–3.
4. Compound according to claim 3 in which $R_1$–$R_4$ are all F.
5. Compound according to to claim 4 wherein $x$ is from 1–19 and $y$ is from 1–20.
6. Compound according to claim 5 wherein $x$ is from 1–14 and $y$ is from 1–15.
7. Compound according to claim 5 wherein $x$ is an odd integer from 1–13 and $y$ is an even integer from 2–14.
8. Compound according to claim 6 wherein $R_5$ is —$C_qH_{2q+1}$ and $R_6$ is

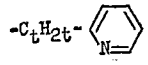

9. Compound according to claim 8 wherein $q$ and $t$ are each 2.
10. Compound according to claim 9 wherein $y$ is 0.
11. Compound according to claim 9 wherein $y$ is 0.
12. Compound according to claim 9 wherein $y$ is 0.
13. Compound according to claim 9 wherein $y$ is 0.
14. A compound according to claim 1 which is

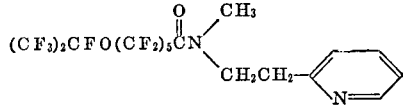

References Cited
UNITED STATES PATENTS
3,423,417    1/1969    Sheehan et al. ___ 260—295 AM ALAN L. ROTMAN, Primary Examiner U.S. Cl. X.R.
260—295.5 AM, 404.5 and 561 R